(12) United States Patent
Hebrard et al.

(10) Patent No.: US 9,989,097 B2
(45) Date of Patent: Jun. 5, 2018

(54) BEARING CAGE WITH ANTENNA AND METHOD FOR DETECTING FAILURE OF A BEARING CAGE

(71) Applicant: Aktiebolaget SKF, Gothenburg (SE)

(72) Inventors: Yoann Hebrard, Sarras (FR); Defeng Lang, Delft (NL); Andreas Karlsson, Alcobendas (ES); Victor Martinez, Madrid (ES); Frank de Wit, Noordeloos (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/278,082

(22) Filed: Sep. 28, 2016

(65) Prior Publication Data

US 2017/0102036 A1 Apr. 13, 2017

(30) Foreign Application Priority Data

Sep. 30, 2015 (EP) ..................................... 15380043

(51) Int. Cl.
*F16C 41/00* (2006.01)
*F16C 33/46* (2006.01)
(Continued)

(52) U.S. Cl.
CPC ........ *F16C 41/008* (2013.01); *F16C 33/3831* (2013.01); *F16C 33/44* (2013.01); *F16C 33/4611* (2013.01); *F16C 33/56* (2013.01); *F16C 41/002* (2013.01); *G01M 13/04* (2013.01); *H01Q 1/27* (2013.01); *H01Q 7/00* (2013.01); *F16C 2233/00* (2013.01)

(58) Field of Classification Search
CPC ...... F16C 33/44; F16C 33/4611; F16C 33/56; F16C 41/008; F16C 33/3831; F16C 2233/00; F16C 41/002; G01M 13/04; H01Q 7/00; H01Q 1/27; H01Q 11/00
USPC ....... 384/448, 459, 523, 537, 548, 572, 576, 384/682, 691; 324/207.13, 521, 605, 609, 324/76.51, 683
See application file for complete search history.

(56) References Cited

U.S. PATENT DOCUMENTS 6,324,899 B1 * 12/2001 Discenzo ................ F16C 19/52
340/631
7,780,357 B2 * 8/2010 Varonis ................... G01P 3/443
324/178

(Continued)

FOREIGN PATENT DOCUMENTS

EP 2128587 A1 12/2009
WO 2006083736 A1 8/2006

*Primary Examiner* — Marcus Charles
(74) *Attorney, Agent, or Firm* — Bryan Peckjian; SKF USA Inc. Patent Dept.

(57) ABSTRACT

The invention relates to a bearing cage including a bearing cage main body made of a polymer material and having pockets for receiving at least one row of rolling elements of a bearing. The cage is provided with a passive resonant circuit including an antenna coil attached to the cage main body. It is proposed that the antenna coil is formed as a conductive layer directly attached to the cage material of the bearing cage main body and is designed so as to have a breaking point less than or equal to a breaking point of the cage material. Thus, a rupture in the cage main body ruptures the antenna coil, changing the resonance behavior of the passive resonant circuit.

13 Claims, 4 Drawing Sheets

(51) Int. Cl.
*F16C 33/56* (2006.01)
*F16C 33/38* (2006.01)
*F16C 33/44* (2006.01)
*G01M 13/04* (2006.01)
*H01Q 7/00* (2006.01)
*H01Q 1/27* (2006.01)

(56) References Cited

U.S. PATENT DOCUMENTS

| | | | |
|---|---|---|---|
| 9,512,882 B2 * | 12/2016 | Wei | F16C 19/28 |
| 2010/0013463 A1 * | 1/2010 | Ozaki | G01D 5/245 |
| | | | 324/207.2 |
| 2010/0299926 A1 * | 12/2010 | Stitzinger | F16C 19/52 |
| | | | 29/898.09 |
| 2015/0260229 A1 * | 9/2015 | Adane | F16C 41/008 |
| | | | 384/448 |

* cited by examiner

BEARING CAGE WITH ANTENNA AND METHOD FOR DETECTING FAILURE OF A BEARING CAGE

CROSS REFERENCE TO RELATED APPLICATIONS

This application claims priority to European patent application no. 15380043.8 filed on Sep. 30, 2015, the contents of which are fully incorporated herein by reference.

FIELD OF THE INVENTION

The invention relates to a bearing cage including an antenna. In particular, the invention relates to a bearing cage including an antenna having a passive resonant circuit including an antenna coil attached to the cage main body,

BACKGROUND OF THE INVENTION

It is known to provide bearings such as ball bearings or roller bearings with temperature sensors. For monitoring the bearing, heat generated at the interface of balls/rollers and the raceways is detected by a temperature sensor located as close as possible to this interface. This makes a cage of a bearing a desirable position for temperature measurement. However, a bearing cage is rotating and cannot be easily accessed and the available space is narrow. In particular for smaller bearings, it is difficult to integrate batteries or a generator into the bearing cage.

The document EP 1 849 013 B1 discloses a bearing having a cage equipped with a power receiving coil. A transmitter for sending a signal indicative of the sensed condition of the bearing to further antennae arranged on the outer race is integrated in the cage. However, this solution is feasible only for larger bearings with a cage capable of supporting the transmitter electronics.

Passive wireless temperature sensors for bearing cages have been proposed e.g. in the article "A Passive Wireless Temperature Sensor for Harsh Environment Applications", Sensors 2008, 7982-7995 by Ya Wang, Yi Jia, Qiushui Chen and Yanyun Wang. A passive oscillator circuit including a temperature dependent capacitance and an inductor is arranged on a cage such that the inductor coil interacts with a transmitter coil of a driven oscillator circuit arranged on a non-rotating ring of the bearing. The temperature dependence of the capacitance results in a temperature dependence of the resonance frequency of the resonant circuit in the cage which can be measured. Similar systems have been investigated by S. Scott et al of the Purdue University, see e.g. http://docs.lib.purdue.edu/nanopub/1089.

The resonant circuit in the cage absorbs energy from the primary circuit with a coil on the non-rotating ring such that the resonant frequency can be derived from an absorption peak in the frequency sweep. The method measures the energy missing at the oscillation frequency.

It is further known to equip train bearing units or train axleboxes of high-speed trains with polyamide cages. These train bearing units are sometimes monitored using hot-box infrared scanners arranged alongside the track. These infrared scanners detect increased temperature in bearing components to detect defective bearings. While the polyamide cages have turned out to be safer than the formerly used steel cages, the defects in polyamide cages will not be detectable using the hot-box infrared scanners. The detection of cage failure would also be useful in aerospace bearings, high-speed bearings and may other applications.

The invention seeks to provide improved polymer cages for bearings with simplified possibility to detect cage damage.

BRIEF SUMMARY OF THE INVENTION

In order to achieve the above object, the invention proposes a bearing cage including a bearing cage main body made of a polymer material, which provides pockets for receiving at least one row of rolling elements of a bearing. The cage is provided with a passive resonant circuit comprising at least one antenna coil attached to the bearing cage main body. Suitably, the at least one antenna coil serves as an inductor coil of the passive resonant circuit.

It is proposed that the antenna coil is formed as a conductive layer directly attached to the polymer material of the bearing cage main body and is designed so as to have a breaking point equal to or less than a breaking point of the polymer material. The polymer material of the cage main body may provide polyamide, phenolic resin, polyetheretherketone (PEEK), polyetherketoneketone (PEKK) or other polymer.

In this context, the breaking point means in particular an elongation at fracture of the material, and the materials of the polymer base body and of the antenna coil shall be chosen such that the antenna coil ruptures when the cage material of the bearing cage main body does so. This can be achieved, in particular, by using a thin conductive layer as the antenna coil. At the same time, the adhesion of the antenna coil to the surface of the bearing cage main body shall be sufficiently strong to make sure that the antenna coil layer ruptures rather than peels off when the strain becomes too large.

This specific relation between the rupturing strength of the polymer base body and the conductive layer can be achieved, in particular, in embodiments where the antenna coil is printed onto the cage material or where the antenna coil is formed as a plating on the cage material.

In one embodiment, the antenna coil is executed as a single loop that extends around the full circumference of the cage main body. Is some examples, the single loop is provided on an axially oriented side face of the cage. In other examples, the single loop is provided on a radially oriented surface of the cage. The single loop may then include sections that extend in an axial direction of the cage, between adjacent pockets of the cage, and further include sections that extend in a circumferential direction of the cage, between an axial side of the cage pockets and a lateral rim of the cage. Such an execution increases the surface area of the cage main body that is covered by the inductor coil, thereby increasing the likelihood that even a small local crack in the cage will cause a rupture in the antenna coil.

The advantage of a single loop is that a rupture of the antenna coil at any location results in the passive resonant circuit losing its ability to resonate. This can be easily and reliably detected in order to determine that cage failure has occurred.

In a further embodiment, the antenna coil contains multiple loops which are connected to each other in parallel. If one loop is ruptured, the inductance of the resonant circuit will change, resulting in a change in amplitude of a signal transmitted by the antenna coil.

In a further embodiment, the antenna coil is provided with a design such that a rupture at any relevant section of the bearing cage main body affects the conductivity of the antenna coil at least by increasing the resistance, preferably by completely interrupting the conductive connection at the point of the crack such that the antenna loop is opened.

In one example, the bearing cage has a ladder structure and includes two lateral rims connected by cross-bars configured to separate the rolling elements. The antenna coil preferably extends over all the relevant parts of the bearing cage main body, i.e. over the entire circumference of the lateral rims and over the entire length of each of the cross-bars.

Preferably, the antenna coil is embedded into the cage material, either by overmolding a very thin and fragile metal sheet or by printing or coating the conductive layer forming the antenna coil onto a surface of a first part of the bearing cage main body which would then be overmolded in a second molding step. The structuring of the antenna coil may further include etching.

Advantageously, the antenna coil may be embedded to a shallow depth that represents an unacceptable amount of cage wear. The coil is suitably embedded in a wear surface of the cage which, in operational use, is in moving contact with a further surface of a bearing that provides the cage. Cage failure due to wear is thus detectable.

In one embodiment of the invention, the passive resonant circuit provided on the cage main body includes a capacitor and the antenna coil serves as the inductor, thus forming a simple LC tank circuit. In a further embodiment, the passive resonant circuit forms part of an RFID transceiver including the antenna coil, and an RFID circuit connected to the antenna coil. An important aspect of the invention is that the resonant circuit returns a different signal when a rupture exists in the antenna coil. The signal may be different in that the frequency is modified, in that the amplitude is reduced or in that no signal is returned at all. The RFID circuit may further include or communicate with sensors such as temperature sensors mounted on the bearing cage or on the RFID chip, as desired.

A bearing including a bearing cage as described above preferably includes a primary antenna of a transmitter that is attached to a non-rotational ring of the bearing, either directly or via a bearing seal or cap. The transmitter provides a driven oscillator circuit and the primary antenna is configured to send and receive signals to and from the antenna coil on the cage.

According to a further aspect of the invention, a bearing unit including a bearing as described above is provided with a signal processing unit configured to monitor a response signal of the antenna coil received by the primary antenna and to generate a warning upon detecting a change in amplitude and/or frequency of the response signal or upon detecting an absence of the response signal. The warning information may include a warning lamp or a warning signal to a machine operator, e.g. to an operator of the train. The signal processing unit can be connected only during maintenance or permanently.

In an embodiment, the bearing unit provides a second passive resonant circuit that is adapted to resonate in response to an interrogation signal transmitted by the primary antenna. Preferably, the second passive resonant circuit is provided on the same stationary part of the bearing as the transmitter, at a location that is not subject to wear or damage. The second passive resonant circuit serves as a reference, to verify correct operation of the transmitter. The processing unit is then suitably configured to generate a warning that the transmitter is defective in the event that the absence of a response signal from both the first and second passive resonant circuits is detected.

A bearing cage as described above is suitable for implementing a method for detecting a failure of a bearing cage including steps of:
    generating an interrogation signal at a resonance frequency of a circuit including the antenna coil;
    receiving a response signal from the antenna coil; and
    monitoring the response signal to detect a rupture of the antenna coil, based on detecting no response signal or upon detecting a change in the frequency and/or amplitude of the response signal.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

BRIEF DESCRIPTION OF THE SEVERAL VIEWS OF THE DRAWING

FIG. 3b is a side view of the bearing cage from FIG. 3a;

FIG. 3c is a sectional view of a seal used in the bearing of FIG. 3a;

DETAILED DESCRIPTION OF THE INVENTION

Figure 1:
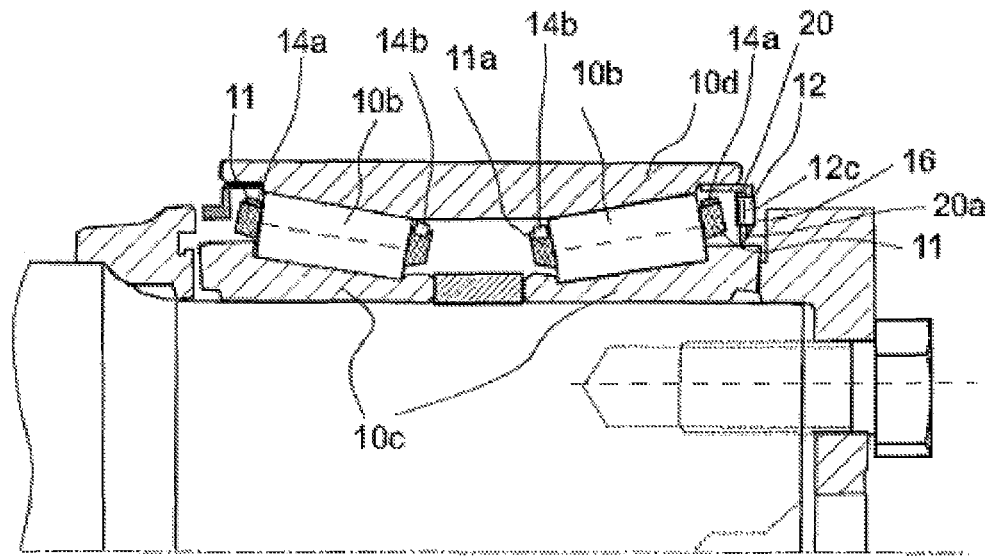
FIG. 1 is a sectional view of an example of a bearing equipped with a cage according to the invention and a sensor assembly for detecting cage failure.

FIG. 1 illustrates a train bearing unit including a double-row tapered roller bearing 10 including two ring-shaped bearing cages 11, a split inner ring 10c and an outer ring 10d configured to accommodate two rows of rolling elements 10b of the bearing, formed as tapered rollers.

The bearing unit is equipped with a sensor assembly, which includes a transmitter 12 attached to a bearing seal 20 and configured to generate oscillating current signals in a primary coil 12c of the transmitter.

Further, the sensor assembly includes a passive resonant circuit 14 (refer FIG. 2) including an antenna coil 14a attached to the bearing cage 11, and an RFID chip 14b. The RFID chip 14b may include various sensors such as a temperature sensor.

In the depicted example, the primary coil 12c is embedded in an elastomeric material 20a of the seal 20. The primary coil may also be attached to the bearing outer ring 10d and may be formed as a loop extending over the entire circumference of the bearing or otherwise be configured to generate signals for communicating with the RFID chip 14b. In a preferred embodiment of the invention, the antenna coil 14a, acting as the inductor coil of the passive resonant circuit 14, is also formed as a circular loop extending over the entire circumference of the bearing cage 11. The primary coil 12c and the antenna coil 14a are preferably arranged coaxially and close to each other, i.e. such that a distance between the coil wires is less than 20%, preferably less than 10%, of the radius of the circular coil loops.

Figure 2:
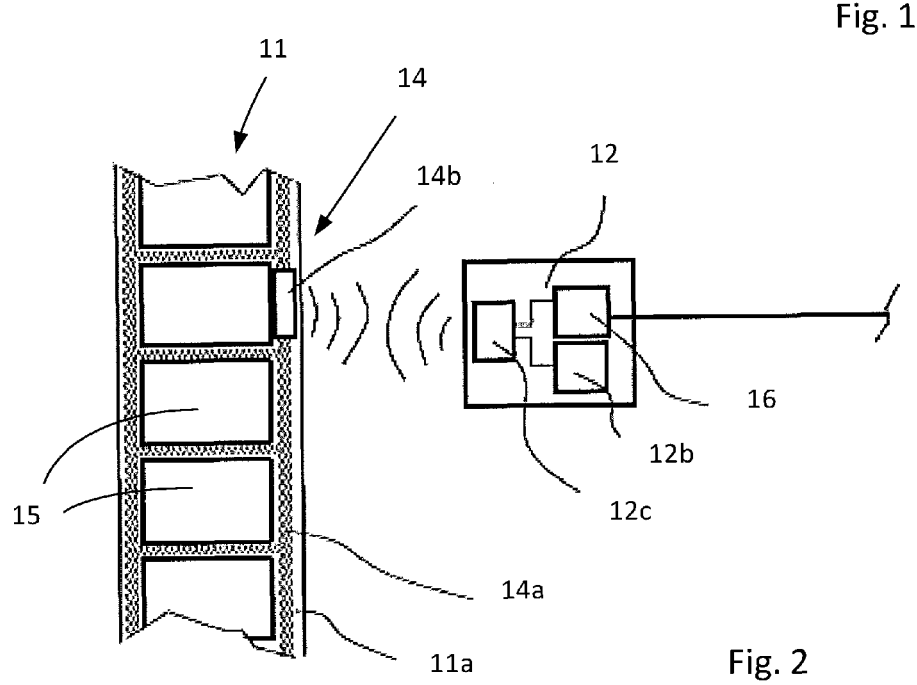
FIG. 2 is a schematic view of part of the bearing cage used in the bearing of FIG. 1, and circuit components associated with the sensor assembly.

The two bearing cages 11 have the same configuration. FIG. 2 schematically illustrates part of one of the bearing cages 11, which includes a bearing cage main body 11a made of polyamide as an example of a robust cage material. The bearing cage main body 11a has pockets 15 for accommodating one row of rolling elements 10b of the bearing 10 and the antenna coil 14a is attached to the cage main body 11a.

The antenna coil 14a is formed as a conductive layer directly attached to the cage material of the bearing cage main body 11a and is designed so as to have a breaking point lower than a breaking point of the cage material. That is, the antenna coil is fragile enough and the adhesion of the antenna coil 14a is strong enough to make sure that a crack on a portion of the surface of the bearing cage main body 11a will lead to a crack in the antenna coil 14a, i.e. will make the antenna coil 14 non-conductive.

In the depicted example, the antenna coil 14a is designed such that it covers each of the essential parts of the bearing cage main body 11a where there is a risk of cracks occurring. Consequently, the conductivity of the antenna coil 14a is reliably interrupted once a crack in the bearing cage main body 11a occurs and this can be detected as a difference in frequency and/or amplitude of the resonant frequency of the antenna coil 14a or as the complete absence of resonance, depending on the nature of the crack.

In the embodiment of FIGS. 1-2, the antenna coil 14a is printed onto the cage material. Alternatively, the antenna coil 14a may be formed as a plating on the cage material or as a very thin metal sheet which is then overmoulded by the polyamide material such that that the antenna coil 14a is at least partially embedded into the cage material. The antenna coil 14a could further be attached to the bearing cage main body 11a by gluing and/or be protected by a protective layer.

As illustrated in FIG. 2 the bearing cage main body 11a includes two lateral ring structures connected by cross-bars configured to separate the rolling elements, wherein the antenna coil 14a extends over the entire circumference of each of the lateral ring structures and over the entire length of each of the cross-bars. The bearing cage main body 11a includes multiple pockets configured to receive one of the rolling elements, wherein the antenna structure includes multiple loops and each of the pockets 15 is encompassed by at least one of the loops. The antenna coil 14a has a ladder structure, wherein the rungs extend along the cross-bars of the bearing cage main body 11a configured to separate the rolling elements.

A bearing unit including a bearing according the invention further includes a signal processing unit 16, wherein the signal processing unit 16 is configured to analyze the signal of the antenna coil 14a received by the primary coil 12c of the transmitter and to generate a warning upon detecting that the antenna coil 14a is broken, based upon detecting an absence of a response signal or a change in the frequency and/or amplitude of the response signal. The signal processing unit 16 may be integrated into the transmitter 12 or be located remotely, e.g. in a control unit of the train using the bearing.

Referring to FIG. 2, the function of the transmitter 12 and passive resonant circuit will be described in the following. The oscillating current signals generated by a function generator 12b are fed into the primary coil 12c to generate an interrogation signal that induces current in the antenna coil 14a. As long as the antenna coil 14a is intact, the induced current will be sufficient to energize the RFID chip 14b, which then returns a signal which may or may not carry additional information, e.g. an ID number of the bearing or information on the temperature.

If the amplitude, the frequency or any other characteristic of the signal returned by the RFID chip 14b does not correspond to what is expected by the signal processing unit 16, the signal processing unit 16 issues a warning signal indicating that the cage 11 is broken.

The signal processing unit 16 therefore implements a method for detecting failure of the bearing cage 11, which includes steps of generating an interrogation signal at a resonance frequency of a circuit including the antenna coil 14a, receiving a response signal from the antenna coil 14a, analyzing the response signal to detect a rupture of the antenna coil 14a, based upon detecting an absence of a response signal or a change in the frequency and/or amplitude of the response signal and detecting a failure of the bearing cage 11 if the antenna coil 14a is ruptured.

Figure 3A:
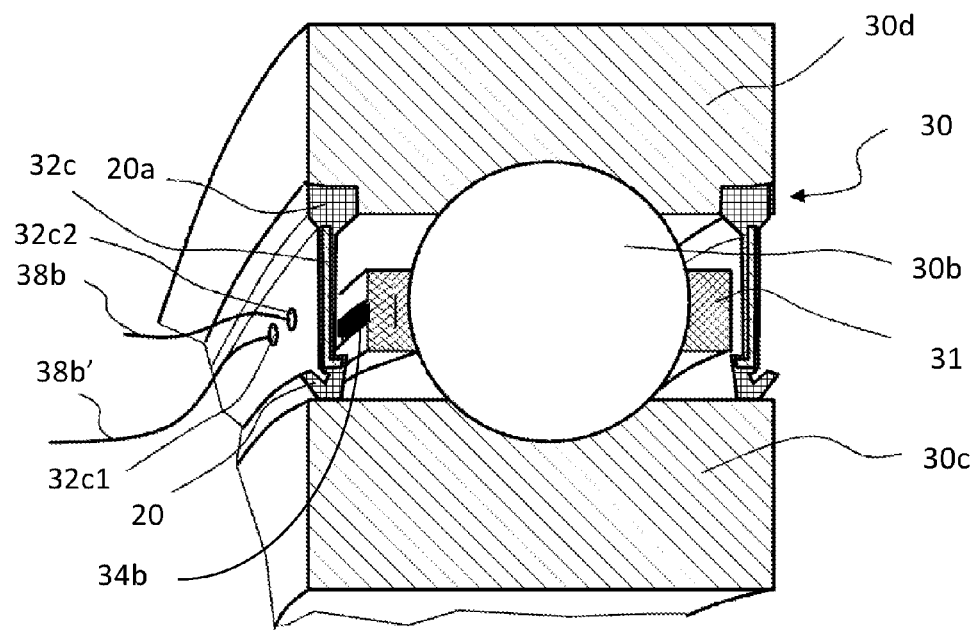
FIG. 3a is a cut perspective view of a further example of a bearing equipped with a cage according to the invention and a sensor assembly for detecting cage failure.
Figure 3B:
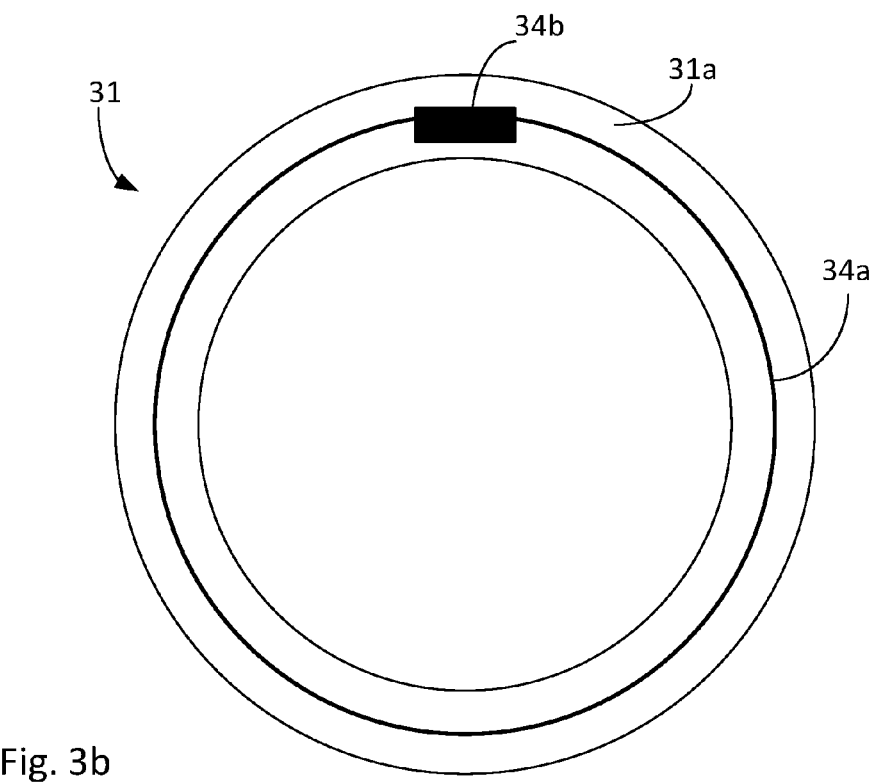

A second embodiment of a bearing according to the invention is depicted in FIG. 3a. In this embodiment, the bearing 30 is a sealed deep-groove ball bearing comprising an inner ring 30c, an outer ring 30d a single row of balls 30b and a seal 20 at either axial side of the bearing for enclosing an annular gap between the bearing rings. The balls are retained by a ball cage 31, a side view of which is shown in FIG. 3b. A main body 31a of the cage is made of a polymer material, and is provided with a passive resonant circuit, including a capacitor 34b and an antenna coil 34a, which are arranged on an axially oriented side face of the cage main body. The antenna coil 34a, which serves as the inductor of the passive resonant circuit, is executed as a single loop that extends around the full circumference of the cage side face. In accordance with the invention, the conductive material of the antenna coil 34a has a breaking point that is less than or equal to a breaking point of the polymer material of the cage main body 31a.

Figure 3C:
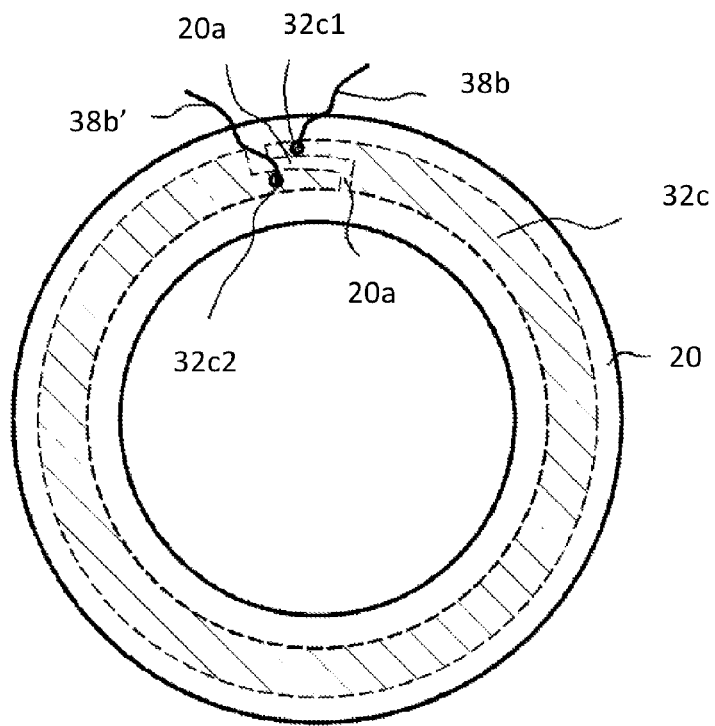

Consequently, if the antenna coil is ruptured, due to a crack in the cage main body 31a, the passive resonant circuit will cease to resonate when stimulated by an interrogation signal. To detect this loss of resonance, the bearing is further equipped with a transmitter, parts of which are integrated in a seal 20 that faces towards to the capacitor 34b and antenna coil 34a on the cage. A side view of the seal is shown in FIG. 3c.

The transmitter includes a function generator generating oscillating current signals and a primary antenna 32c, which in the depicted embodiment is formed as a stiffening ring of the seal 20. The stiffening ring is a sheet metal ring embedded in the seal 20, which is provided with a gap filled with the isolating elastomeric material 20a. End parts of the primary antenna 32c on opposite sides adjacent to the gap are provided with a connecting point 32c1, 32c2 for signal wires 38b, 38b', respectively, which are formed by solder points in the embodiment illustrated. The signal wires are connected to a processor (not shown) which is configured to transmit an alarm if a response signal from the passive resonance circuit is not received by the primary antenna 32c in response to an interrogation signal from the transmitter.

Figure 4:
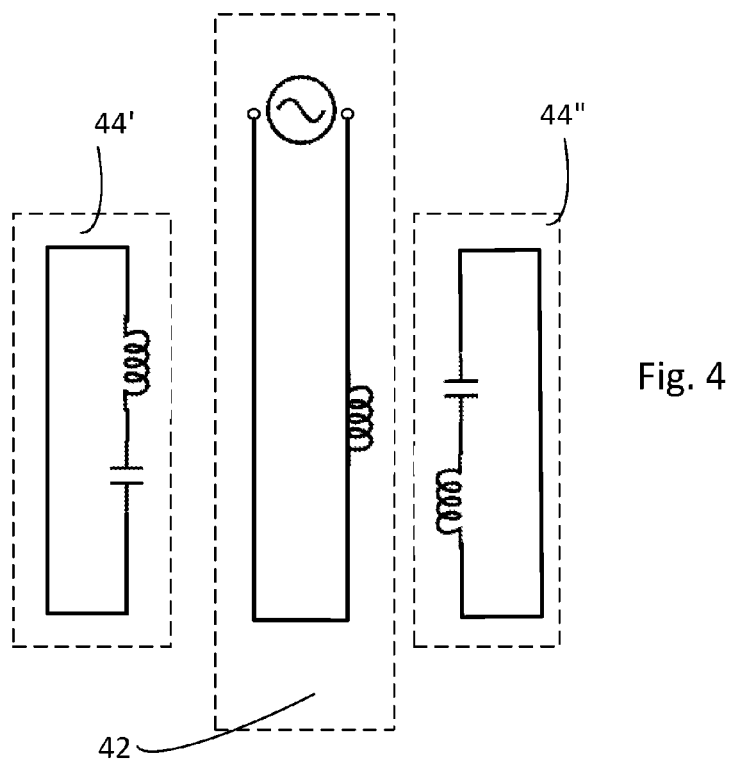
FIG. 4 is a circuit diagram of a sensor assembly for detecting cage failure according to a further embodiment.

In a further development, the stationary part of the bearing arrangement is provided with a second passive resonant circuit, which may also be integrated on the seal or otherwise located in proximity to the transmitter. The circuit diagram shown in FIG. 4 will be used to explain the operating principle. Under normal conditions, a processor (not shown) connected to the transmitter 42, will receive a first response signal from the first passive resonant circuit 44' on the cage and a second response signal from the second passive resonant circuit 44". If only the first response signal fails to be received, a warning to indicate cage failure is sent, as described previously. If neither of the first and second response signals is received, this is indicative of a failure in the transmitter circuit, and the processor is configured to send an appropriate alert.

Figure 5:
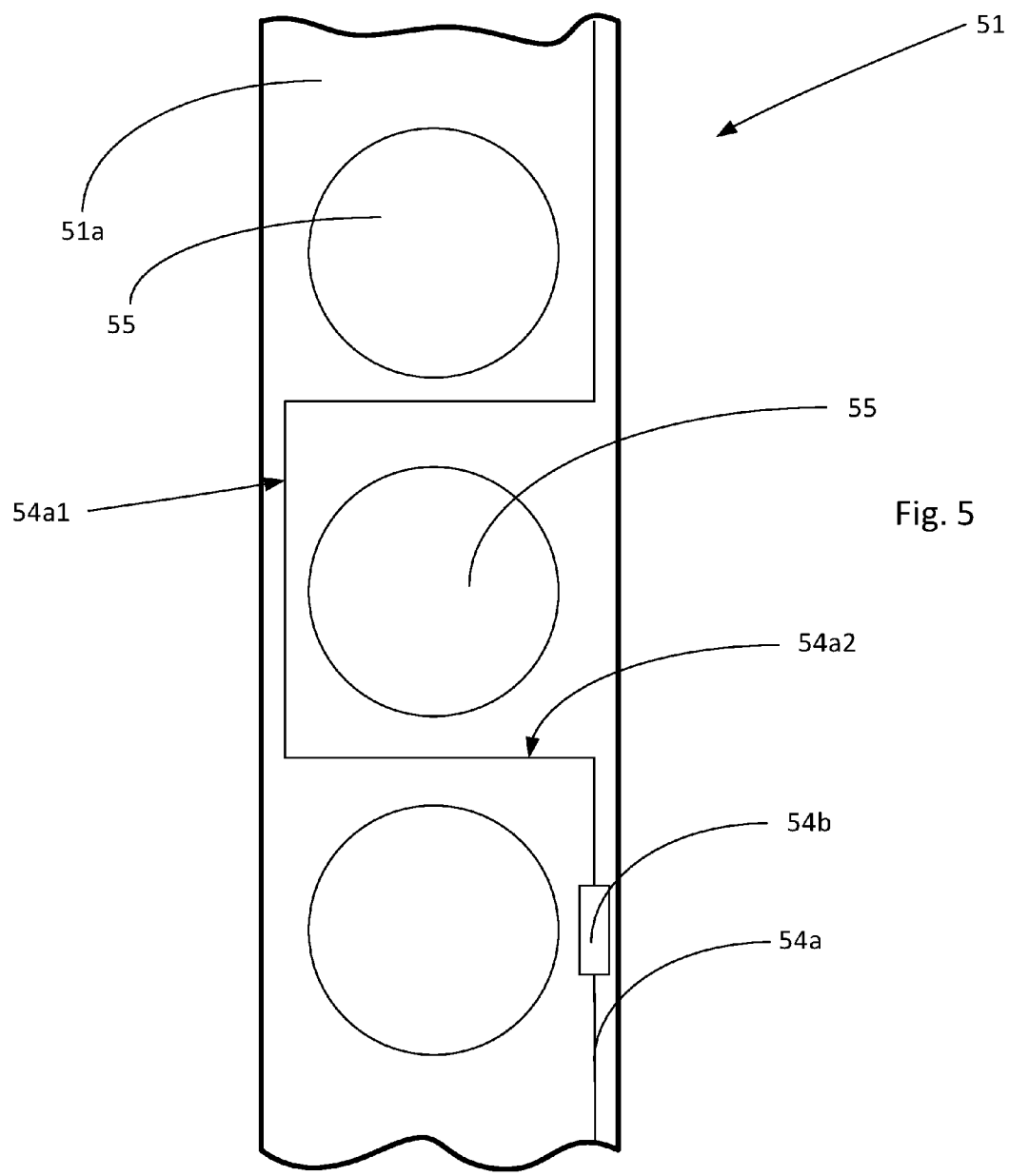
FIG. 5 is a schematic view of part of a bearing cage according to a further embodiment of the invention.

The cage antenna coil, in the form of a single loop, may also be provided on a radially oriented surface of the cage. An example of part of a cage 51 according to this embodiment of the invention is shown in FIG. 5. The passive resonant circuit again provides a capacitor 54b and an antenna coil 54a that is e.g. printed onto a main body 51 of the cage, which in the depicted example is made of phenolic resin. The antenna coil is adapted to break in response to a crack in the cage main body. To increase the likelihood of a small crack in the cage rupturing the antenna, the coil has first sections 54a1 that extend in a circumferential direction of the cage, and second sections 54a2 that extend in an axial direction, between adjacent cage pockets 55. As will be understood, the coil can provide multiple second sections that run back and forth between adjacent pockets 55, and/or multiple first sections 54a1 that run back and forth between a rim of the cage and a corresponding axial side of a cage pocket.

In this example, the cage is an outer-ring-guided cage, and has wear surfaces at either axial side of the cage which, during bearing operation, come into contact with shoulders of the bearing outer ring. The antenna coil is embedded in the radially outer surface of the cage main body 51a to a shallow depth, which constitutes an unacceptable amount of wear. The cage 51 can therefore be used to detect cage failure due to a crack in the main body 51a that ruptures the antenna coil and due to unacceptable wear of the cage, which likewise wears off the material of the antenna coil, leading to an interruption that causes the passive resonant circuit to lose its ability to resonate.

In other embodiments, the axial side face of a cage is a wear surface and may be provided with an embedded antenna coil for detecting wear. Thus, many variations are possible with the scope of the following claims.

The invention claimed is:

1. A bearing cage comprising:
   a bearing cage main body made of a polymer material and configured to accommodate at least one row of rolling elements of a bearing, and
   a passive resonant circuit including an antenna coil attached to the cage main body, the passive resonant circuit also functioning as a crack detection sensor to detect cracks in the bearing cage main body wherein the antenna coil is formed as a conductive layer directly attached to the cage material of the bearing cage main body and is designed to have a breaking point lower than a breaking point of the cage material such that a crack in the bearing cage main body results in breakage of a portion of the passive resonant circuit.

2. The bearing cage according to claim 1, wherein the antenna coil is printed onto the cage material.

3. The bearing cage according to claim 1, wherein at least part of the antenna coil is embedded into a surface of the cage material.

4. The bearing cage according to claim 3, wherein the surface of the cage material into which at least part of the antenna coil is embedded is a wear surface of the bearing cage which, during bearing operation, is in contact with a surface of a further component of the bearing.

5. The bearing cage according to claim 1, wherein the antenna coil is executed as a single loop that extends around the full circumference of the cage main body.

6. The bearing cage according to claim 5, wherein the antenna coil is provided on an axially oriented side face of the cage main body.

7. The bearing cage according to claim 5, wherein the antenna coil is provided on a radially oriented surface of the cage main body.

8. The bearing cage according to claim 5, wherein the bearing cage main body includes multiple pockets configured to receive one of the rolling elements, and wherein
   the antenna coil comprises first antenna sections that extend in a circumferential direction of the cage and second antenna sections that extend in an axial direction, between adjacent pockets.

9. The bearing cage according to claim 1, wherein the antenna coil comprises two or more loops which are connected in parallel to each other.

10. The bearing cage according to claim 1, wherein the bearing cage main body includes multiple pockets configured to receive one of the rolling elements, wherein the antenna coil includes multiple loops, and wherein each of the openings is encompassed by at least one of the loops.

11. The bearing cage according to claim 1, wherein the bearing cage main body includes two lateral ring structures connected by cross-bars configured to separate the rolling elements, and wherein the antenna coil extends over the entire circumference of each of the lateral ring structures and over the entire length of each of the cross-bars.

12. A bearing unit comprising:
    a bearing providing a bearing cage having a bearing cage main body made of a polymer material and configured to accommodate at least one row of rolling elements of a bearing, and
    a passive resonant circuit including an antenna coil attached to the cage main body, wherein
    the antenna coil is formed as a conductive layer directly attached to the cage material of the bearing cage main body and is designed to have a breaking point lower than a breaking point of the cage material, and
    a transmitter including a primary antenna is connected to a ring or a seal of the bearing, wherein
    the primary antenna is configured to send and receive signals to and from the antenna coil, and
    a signal processing unit,
    the signal processing unit is configured to monitor a response signal from the antenna coil received by the primary antenna and to generate a warning upon detecting that no response signal is received or that a change in the amplitude or that a change in resonance frequency of the response signal has occurred,
    a second passive resonant circuit mounted in proximity to the transmitter on a stationary part of the bearing that is not subject to wear or damage and which is configured to emit a second response signal upon receiving an interrogation signal from the primary antenna, and wherein
    the processing unit is configured to generate a warning that the transmitter is defective if neither a first response signal from the passive resonant circuit on the cage nor the second response signal is received.

13. A method for detecting failure of a bearing cage in the bearing unit of claim 12, the method comprising steps of:
    a. generating an interrogation signal at a resonance frequency of the passive resonant circuit including the antenna coil (14a, 34a), b. monitoring a response signal from the antenna coil,
c. detecting a failure of the bearing cage if no response signal is received or if a change in amplitude or that a change in resonant frequency of the response signal is measured.

* * * * *